(12) United States Patent
Cheng et al.

(10) Patent No.: US 10,749,638 B2
(45) Date of Patent: Aug. 18, 2020

(54) SOFT BUFFER HANDLING WITH LIMITED MEMORY ACCESS BANDWIDTH

(71) Applicant: Telefonaktiebolaget LM Ericsson (publ), Stockholm (SE)

(72) Inventors: Jung-Fu Cheng, Fremont, CA (US); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/764,292

(22) PCT Filed: Oct. 6, 2016

(86) PCT No.: PCT/SE2016/050962
§ 371 (c)(1),
(2) Date: Mar. 28, 2018

(87) PCT Pub. No.: WO2017/069676
PCT Pub. Date: Apr. 27, 2017

(65) Prior Publication Data
US 2018/0309547 A1 Oct. 25, 2018

Related U.S. Application Data

(60) Provisional application No. 62/243,487, filed on Oct. 19, 2015.

(51) Int. Cl.
*H04L 1/18* (2006.01)
*H04W 4/70* (2018.01)

(52) U.S. Cl.
CPC .......... *H04L 1/1819* (2013.01); *H04L 1/1845* (2013.01); *H04L 1/1896* (2013.01); *H04W 4/70* (2018.02)

(58) Field of Classification Search
CPC ... H04L 1/1819; H04L 1/1845; H04L 1/1896; H04W 4/70
(Continued)

(56) References Cited

U.S. PATENT DOCUMENTS 9,991,989 B2 * 6/2018 Malladi ................ H04L 1/0045
2009/0249155 A1 10/2009 Mayrench et al.
(Continued)

OTHER PUBLICATIONS

Author Unknown, "Technical Specification Group Radio Access Network; Evolved Universal Terrestrial Radio Access (E-UTRA); Multiplexing and channel coding (Release 12)," Technical Specification 36.212, Version 12.6.0, 3GPP Organizational Partners, Sep. 2015, 95 pages.
(Continued)

*Primary Examiner* — Hassan A Phillips
*Assistant Examiner* — Mohammed S Chowdhury
(74) *Attorney, Agent, or Firm* — Withrow & Terranova, PLLC

(57) ABSTRACT

Systems and methods for soft buffer handling with limited memory access bandwidth are provided herein. In some embodiments, a method of operation of a User Equipment (UE) of a cellular communications network includes receiving a retransmission that would require a total number of memory accesses to process that is greater than a memory access bandwidth of a soft buffer of the UE. The method also includes prioritizing which bits should be read from or written to the soft buffer of the UE when processing the retransmission based on the memory access bandwidth, any previously received redundancy versions, and/or a currently received redundancy version. According to some embodiments, this achieves higher system performance than Chase Combining alone while keeping the receiver implementation limitation as low as alternative solutions.

10 Claims, 14 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2011/0145670 A1 | 6/2011 | Fan et al. | |
| 2015/0229445 A1* | 8/2015 | Michel | H04L 1/0045 |
| | | | 714/751 |
| 2015/0351092 A1* | 12/2015 | Seo | H04W 4/70 |
| | | | 370/329 |
| 2016/0088635 A1* | 3/2016 | Davydov | H04L 1/1812 |
| | | | 370/329 |
| 2016/0227540 A1* | 8/2016 | Chen | H04L 5/001 |

OTHER PUBLICATIONS

Author Unknown, "Technical Specification Group Radio Access Network; Evolved Universal Terrestrial Radio Access (E-UTRA); Physical layer procedures (Release 12)," Technical Specification 36.213, Version 12.3.0, 3GPP Organizational Partners, Sep. 2014, 212 pages.

Qualcomm Incorporated, "R1-155719: Potential enhancements to physical layer procedure other than DL and UL control," Third Generation Partnership Project (3GPP) TSG RAN WG1 Meeting #82bis, Oct. 5-9, 2015, 2 pages, Malmö, Sweden.

International Search Report and Written Opinion for International Patent Application No. PCT/SE2016/050962, dated Mar. 2, 2017, 15 pages.

\* cited by examiner

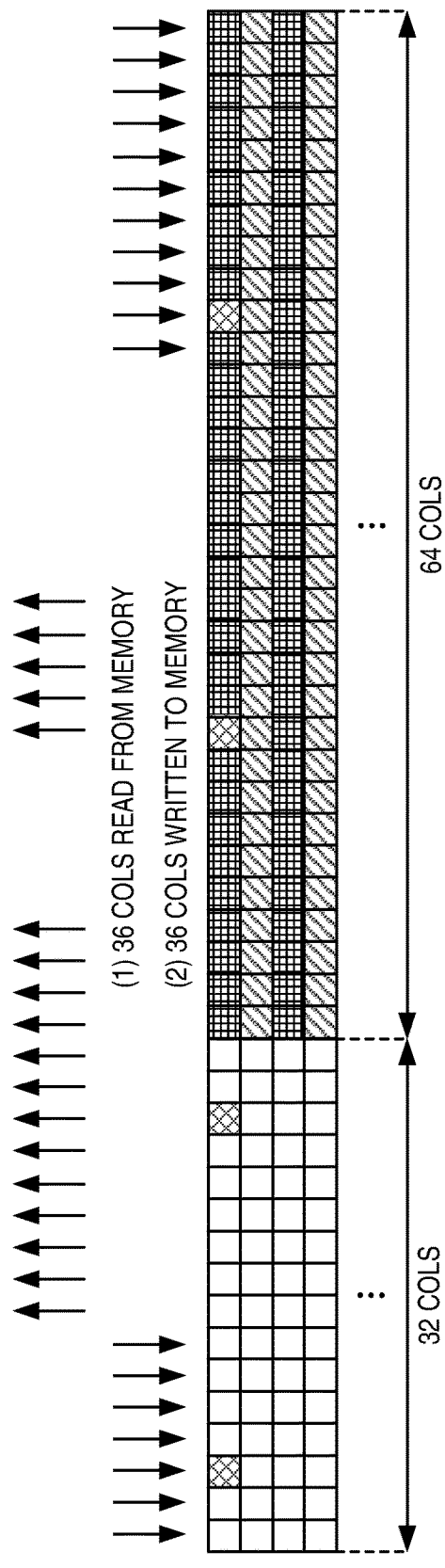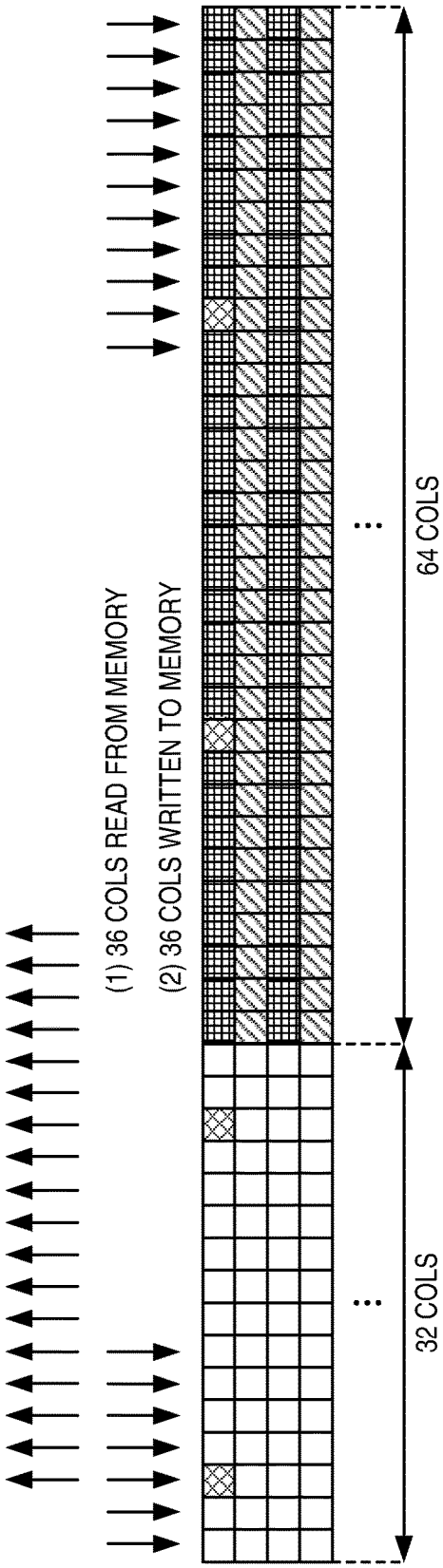
FIG. 15
FIG. 16

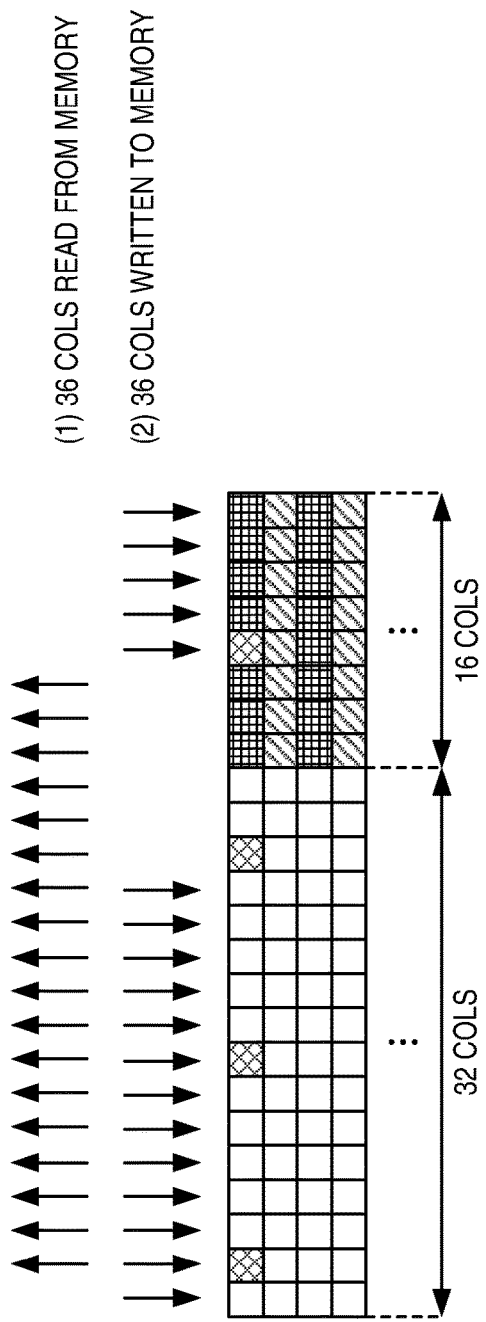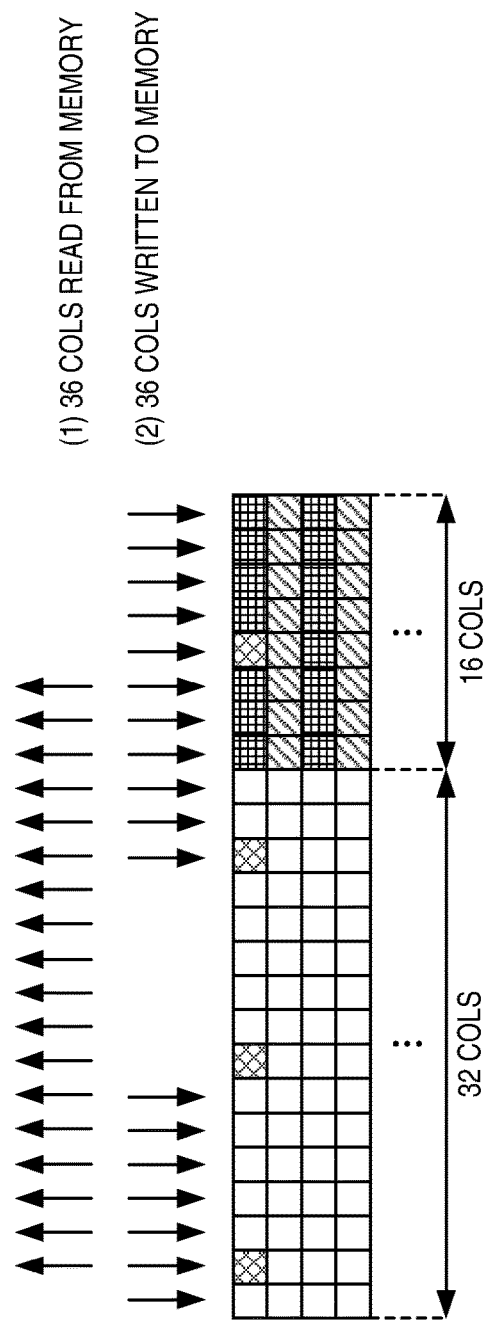

SOFT BUFFER HANDLING WITH LIMITED MEMORY ACCESS BANDWIDTH

RELATED APPLICATIONS

This application is a 35 U.S.C. § 371 national phase filing of International Application No. PCT/SE2016/050962, filed Oct. 6, 2016, which claims the benefit of provisional patent application Ser. No. 62/243,487, filed Oct. 19, 2015, the disclosures of which are hereby incorporated herein by reference in their entireties.

TECHNICAL FIELD

The present disclosure relates to retransmissions and operation of a soft buffer in Hybrid Automatic Repeat Request (HARQ) Operations.

BACKGROUND

Long Term Evolution (LTE) cellular communications systems use Orthogonal Frequency-Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 ms, as shown in FIG. 2, each radio frame consisting of ten equally-sized subframes of length $T_{subframe}=1$ ms.

In LTE transmission using a single spatial layer, one transport block is transmitted to the receiver. When multiple spatial layers are used (such as Multiple Input Multiple Output (MIMO) transmission), two transport blocks are transmitted to the receiver. Since a transport block can be very large (e.g., up to 97896 bits for single spatial layer), a large transport block is divided into a number of code blocks that have suitable sizes for turbo encoding and decoding. For example, the transport block of size 97896 bits is divided into 16 code blocks of size 6144 bits each (including Cyclic Redundancy Check (CRC) bits per LTE specs TS 36.212).

In LTE systems, Hybrid Automatic Retransmission Request (HARQ) protocol is used to enhance transmission reliability. When an initial transmission is not received correctly by the receiver, the receiver stores the received signal in a soft buffer (implemented in a soft buffer memory, where "soft buffer memory" is physical/hardware memory utilized for the soft buffer) and signals to the transmitter of such unsuccessful transmission as illustrated in FIG. 3. The transmitter can then retransmit the information (referred to as the transport block in LTE specs) using the same channel coded bits or different channel coded bits. The receiver can then combine the retransmission signal with that stored in the soft buffer. Such combining of signals greatly enhances the reliability of the transmission. Incorrectly received coded data blocks may be stored as "soft bits" or soft values. These soft bits indicate what the receiver hypothesizes that the bit is and how certain the receiver is that this is a correct hypothesis. These soft bits can be combined with the retransmitted bits to calculate a more accurate hypothesis. These soft bits are stored in a soft buffer at the User Equipment (UE)/receiver so that, when the retransmitted block is received, the received values for the two blocks may be combined. Depending on the implementation, the receiver is only able to perform a certain number of soft bit reads from the soft buffer and soft bit writes to the soft buffer. As used herein, the total number of reads and writes that the receiver is capable of performing in the allotted time is referred to as the memory access bandwidth.

In the LTE system, the data transmission is protected by a rate 1/3 turbo code. To simplify signaling and operation complexity, a conceptual model referred to as a circular buffer is used in the LTE HARQ operations. This circular buffer model is illustrated in FIG. 4 for the case of single spatial layer transmission. The buffer consists of 32 columns of systematic bits followed by 64 columns of parity bits generated by the turbo encoder. The number of rows depends on the size of the transport block to be transmitted.

To simplify the signaling of what bits are transmitted to the receiver, four redundancy versions are defined. Each redundancy version is defined as the bits that can be read out of the circular buffer column-by-column starting from the head of a specific column in the circular buffer. The starting points of the four Redundancy Versions (RV): RV=0, 1, 2 and 3 are the heads of columns #2, #26, #50, and #74 (note the numbering of columns starts from 0). For a transmission using a specific redundancy version, the transmitter reads the bits starting from the start of the redundancy version until the necessary number of bits is obtained. If the reading reaches the end of the buffer and still more bits are needed, the reading of bits then resumes from the beginning of the buffer.

In the case of multi-spatial layer transmission, two transport blocks are transmitted in LTE. The circular buffer size is cut in half by discarding part of the parity bits. More specifically, the circular buffer model for LTE is illustrated in FIG. 5 for the case of multi-spatial layer transmission. In this case, the buffer consists of 32 columns of systematic bits followed by 16 columns of parity bits generated by the turbo encoder. The starting points of the four redundancy versions RV=0, 1, 2 and 3 are the heads of columns #2, #14, #26 and #38 (note the numbering of columns starts from 0).

It can be appreciated by one skilled in the art that it is generally advantageous to perform retransmission that carries more bits that have not been transmitted in previous transmission attempts. For instance, in a so-called Chase Combining protocol, the transmitter sends the initial transmission using RV=0 and resends subsequent retransmissions also using RV=0. That is, in Chase Combining, every retransmission contains the same information (data and parity bits). The receiver uses maximum-ratio combining to combine the received bits with the same bits from previous transmissions. Because all transmissions are identical, Chase Combining can be seen as additional repetition coding. That is, every retransmission adds extra energy to the received transmission through an increased $E_b/N_0$ (the energy per bit to noise power spectral density ratio).

Such a simple HARQ protocol as Chase Combining mostly provides benefits from combining the signal energy from the transmissions resulting in, for example, a 3 dB gain for 2 transmissions and 4.8 dB for 3 transmissions. On the other hand, in a so-called Incremental Redundancy protocol, the transmitter picks a redundancy version that shares the lowest number of bits, such as the redundancy version that was used in the initial transmissions. That is, when using Incremental Redundancy, every retransmission contains different information than the previous transmission. Multiple sets of coded bits are generated, each representing the same set of information bits. The retransmission typically uses a different set of coded bits than the previous transmission, with different redundancy versions generated by puncturing the encoder output. Thus, at every retransmission the receiver gains extra information. This HARQ protocol provides both the energy gain as well as additional coding gains. Using the highest rate transmission using 256 Quadrature Amplitude Modulation (QAM) as an example, 8.4 decibel (dB) gains can be obtained after two transmissions, and 11.3 dB gains can be obtained after three transmissions.

The LTE Rel-10 standard supports bandwidths larger than 20 megahertz (MHz). One important requirement on LTE Rel-10 is to assure backward compatibility with LTE Rel-8. This should also include spectrum compatibility. That would imply that an LTE Rel-10 carrier wider than 20 MHz should appear as a number of LTE carriers to an LTE Rel-8 terminal. Each such carrier can be referred to as a Component Carrier (CC). In particular for early LTE Rel-10 deployments, it can be expected that there will be a smaller number of LTE Rel-10-capable terminals compared to many LTE legacy terminals. Therefore, it is necessary to ensure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CCs, where the CCs have, or at least could possibly have, the same structure as a Rel-8 carrier. CA is illustrated in FIG. 6. A CA-capable UE is assigned a Primary Cell (PCell) which is always activated, and one or more Secondary Cells (SCells) which may be activated or deactivated dynamically.

In Rel-13, LAA (Licensed-Assisted Access) has attracted a lot of interest in extending the LTE carrier aggregation feature towards capturing the full breadth of opportunities of unlicensed spectrum in the 5 GHz band. A Wireless Local Area Network (WLAN) operating in the 5 gigahertz (GHz) band nowadays already supports 80 MHz in the field, and 160 MHz is to follow in Wave 2 deployment of Institute of Electrical and Electronics Engineers (IEEE) 802.11ac. There are also other frequency bands, such as 3.5 GHz, where aggregation of more than one carrier on the same band is possible, in addition to the bands already widely in use for LTE. Enabling the utilization of bandwidths for LTE in combination with LAA similar to bandwidths used for IEEE 802.11ac Wave 2 will lead to proposals for extending the carrier aggregation framework to support more than five carriers. The extension of the CA framework beyond five carriers was approved to be one work item for LTE Rel-13. The objective is to support up to thirty two carriers in both Uplink (UL) and Downlink (DL).

To support up to 32 carriers in DL, the Uplink Control Information (UCI) feedback, e.g. HARQ-ACK bits, will increase significantly. For each DL subframe, there are 1 or 2 HARQ-ACK bits per carrier depending on whether spatial multiplexing is supported or not. Hence, for Frequency-Division Duplex (FDD), there can be up to 64 HARQ-ACK bits if there are 32 DL carriers. The number of HARQ-ACK bits for Time-Division Duplex (TDD) is even larger, potentially as high as hundreds of bits depending on the TDD configuration. Therefore, a new Physical Uplink Control Channel (PUCCH) format(s) supporting larger payload is necessary. Similarly, the piggyback of the increased number of UCI bits also motivates the enhancements on UCI feedback on Physical Uplink Shared Channel (PUSCH).

In the LTE specification, each UE is required to store a specific number of received soft bits in its soft buffer. To support high data rate communications, high read and write bandwidths are needed for such soft buffer to and from the baseband processor and the turbo decoder. It has hence been a general practice to incorporate the soft buffer in the same chip with the baseband processor and the turbo decoder.

It has been suggested that the traditional solution of collocating the soft buffer and the baseband processor may not be an economically viable or even technically feasible solution for supporting a large number of carriers. It has further been suggested to adopt off-chip memory. Such a solution would have only limited bandwidth to read and write the soft bits.

Using the single-spatial layer transmission case as a non-limiting example, a receiver will store the soft bits corresponding to RV=0 in the off-chip soft buffer. The bandwidth issue is most limiting when the transmission is using the highest order modulation and the highest coding rate allowed in the LTE specs. This corresponds to 256 QAM Modulation and Coding Scheme (MCS) 27 with code rate r=0.9035. At such code rate, approximately [32/0.9035] =36 columns of soft bits are stored to the soft buffer. When a retransmission using the same RV=0 is received by the receiver, the receiver shall read out the previously stored soft bits and combine them with the newly received soft bits for decoding. If the decoding still fails, the receiver shall write the combined soft bits back to the soft buffer.

As illustrated in FIG. 7, the receiver hardware shall be designed to support enough soft buffer access bandwidth to accomplish the following two sets memory read-writes when the highest order modulation and the highest coding rate are used in the transmissions:

36 cols (#2-#37) read from memory to combine with new soft bits

After decoding fails, 36 cols (#2-#37) of new combined soft bits are written back to memory This memory access bandwidth is proportional to read-writes of 72 columns per turbo code block for the highest MCS transmission. For a receiver designed to just meet such a minimum memory access bandwidth requirement, it may not be able to read the entirety of the stored soft bits from the off-chip memory for soft combining such as those illustrated in FIG. 8 for the single-spatial layer transmission case where two retransmissions fail. Such situation requires memory access bandwidth proportional to read-writes of 108 columns per turbo code block for the highest MCS transmission, which is higher than the designed bandwidth proportional to read-writes of 72 columns.

Further consider the case of multi-spatial layer transmission where two transport blocks are transmitted. For each code block for each transport block, the memory access bandwidth is proportional to read-writes of 72 columns per turbo code block for the highest MCS transmission as illustrated in FIG. 9. Since the two transport blocks may both fail, the receiver should be designed to support memory access bandwidth proportional to read-writes of 2×72=144 columns per turbo code block for the highest MCS transmission.

Similarly, in the case of multi-spatial layer transmission illustrated in FIG. 10 where two retransmissions fail, the required memory access bandwidth is proportional to read-writes of 2×84=168 columns per turbo code block for the highest MCS transmission, which is higher than the designed bandwidth proportional to read-writes of 144 columns.

To overcome such bandwidth limitation, it has been suggested to restrict the HARQ protocol operations to using mostly the same redundancy version as the initial transmissions (i.e., the Chase Combining protocol). However, such a solution severely limits the system performance, as there are large performance differences between Chase Combining and Incremental Redundancy protocols as discussed above. As such, systems and methods are needed for soft buffer handling with limited memory access bandwidth.

SUMMARY

Systems and methods for soft buffer handling with limited memory access bandwidth are provided herein. In some embodiments, a method of operation of a User Equipment (UE) of a cellular communications network includes receiving a retransmission that would require a total number of memory accesses to process that is greater than a memory access bandwidth of a soft buffer of the UE. The method also includes prioritizing which bits should be read from or written to the soft buffer of the UE when processing the retransmission based on the memory access bandwidth, any previously received redundancy versions, and/or a currently received redundancy version. According to some embodiments, this achieves higher system performance than Chase Combining alone while keeping the receiver implementation limitation as low as alternative solutions.

In some embodiments, the method also includes, prior to receiving the retransmission, determining the memory access bandwidth of the soft buffer of the UE.

In some embodiments, prioritizing which of the bits should be read or written includes prioritizing writing bits to the soft buffer of the UE, and therefore not all of the bits will be read from the soft buffer of the UE when processing the retransmission. In some embodiments, prioritizing writing bits to the soft buffer of the UE includes writing bits to the soft buffer of the UE to maximize a number of bits that overlaps between a previous transmission and the retransmission.

In some embodiments, prioritizing which bits should be read or written includes prioritizing reading bits from the soft buffer of the UE, and therefore not all bits will be written to the soft buffer of the UE when processing the retransmission. In some embodiments, prioritizing reading bits from the soft buffer of the UE includes reading bits from the soft buffer of the UE to maximize a number of systemic bits read when processing the retransmission. In some embodiments, prioritizing reading bits from the soft buffer of the UE includes reading bits from the soft buffer of the UE to maximize a number of parity bits read when processing the retransmission. In some embodiments, prioritizing reading bits from the soft buffer of the UE includes reading bits from the soft buffer of the UE to maximize a number of bits that overlaps between previous transmissions.

In some embodiments, receiving the retransmission includes receiving a redundancy version retransmission for incremental redundancy. In some embodiments, the UE is a Machine Type Communication (MTC) UE.

In some embodiments, a transmitter selects a redundancy version for retransmission to optimize performance. The redundancy version selection may further consider receiver memory access bandwidth. In some embodiments, a transmitter obtains information indicative of a memory access bandwidth of a wireless device. In some embodiments, this information is from a UE class definition in LTE, or from capability signaling from the wireless device. The transmitter then selects a redundancy version for retransmission to optimize performance based on the information indicative of the memory access bandwidth of the wireless device. In some embodiments, this retransmission is different than a retransmission would be with just using Chase Combining and provides increased performance with respect to Chase Combining. If a transmission to the wireless device fails, the transmitter retransmits using the selected redundancy version.

In some embodiments, a receiver may determine a memory access bandwidth of a soft buffer used in the receiver. Then, when the receiver receives a retransmission that would require a total number of memory accesses that is greater than the memory access bandwidth (e.g., using RV=0, RV=2, and RV=3), the receiver prioritizes which bits should be read from or written to the soft buffer based on the memory access bandwidth, any previously received redundancy versions, and/or the currently received redundancy version. In some embodiments, the receiver prioritizes reading bits. In some embodiments, the receiver prioritizes reading bits to maximize the number of systemic bits and/or parity bits used. In some embodiments, the receiver prioritizes writing bits. In some embodiments, the receiver prioritizes writing bits that overlap between the previous transmission and the currently received transmission. In some embodiments, the receiver combines two or more factors in determining which bit reads and which bit writes to perform.

As a result, some embodiments achieve high system performance while keeping the receiver implementation limitation as low as the alternative solutions.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 15 illustrates an exemplary soft combining of soft bits for single-spatial layer transmission corresponding to using RV=0, RV=2, and RV=3 for initial transmission and retransmissions at high code rates according to some embodiments of the present disclosure;

FIG. 16 illustrates an exemplary restricted soft combining of soft bits for single-spatial layer transmission corresponding to using RV=0, RV=2, and RV=3 for initial transmission and retransmissions at high code rates according to some embodiments of the present disclosure;

FIG. 17 illustrates an exemplary soft combining of soft bits for multi-spatial layer transmission corresponding to using RV=0, RV=2, and RV=3 for initial transmission and retransmissions at high code rates according to some embodiments of the present disclosure;

FIG. 18 illustrates an exemplary soft combining of soft bits for multi-spatial layer transmission corresponding to using RV=0 and RV=2 for initial transmission and retransmission at high code rates according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any two or more embodiments described below may be combined in any way with each other.

In some embodiments, a non-limiting term User Equipment device (UE) is used. The UE herein can be any type of wireless device capable of communicating with a network node or another UE over radio signals. The UE may also be a radio communication device, a target device, a Device-to-Device (D2D) UE, a machine type UE, a UE capable of Machine-to-Machine (M2M) communication, a sensor equipped with a UE, an iPad, a tablet, a mobile terminal, a smart phone, Laptop Embedded Equipment (LEE), Laptop Mounted Equipment (LME), Universal Serial Bus (USB) dongles, Customer Premises Equipment (CPE), etc.

Also in some embodiments generic terminology, "radio network node" or simply "network node," is used. It can be any kind of network node which may comprise of a base station, a radio base station, a base transceiver station, a base station controller, a network controller, an enhanced or evolved Node B (eNB), a Node B, Multi-cell/Multicast Coordination Entity (MCE), a relay node, an access point, a radio access point, a Remote Radio Unit (RRU) Remote Radio Head (RRH), a core network node (e.g., a Trace Collection Entity (TCE), a Mobility Management Entity (MME), a Minimization of Drive Tests (MDT) node, a Multimedia Broadcast/Multicast Service (MBMS) node), or even an external node (e.g., a third party node, a node external to the current network), etc.

The term 'radio node' used herein may be used to denote a UE or a radio network node.

The embodiments are applicable to single carrier as well as to multicarrier or Carrier Aggregation (CA) operation of the UE in which the UE is able to receive and/or transmit data to more than one serving cell. The term CA is also called (e.g., interchangeably called) "multi-carrier system," "multi-cell operation," "multi-carrier operation," and "multi-carrier" transmission and/or reception. In CA, one of the Component Carriers (CCs) is the Primary CC (PCC) or simply primary carrier or even anchor carrier. The remaining ones are called Secondary CCs (SCCs) or simply secondary carriers or even supplementary carriers. The serving cell is interchangeably called a Primary Cell (PCell) or Primary Serving Cell (PSC). Similarly the secondary serving cell is interchangeably called a Secondary Cell (SCell) or Secondary Serving Cell (SSC).

Figure 11:
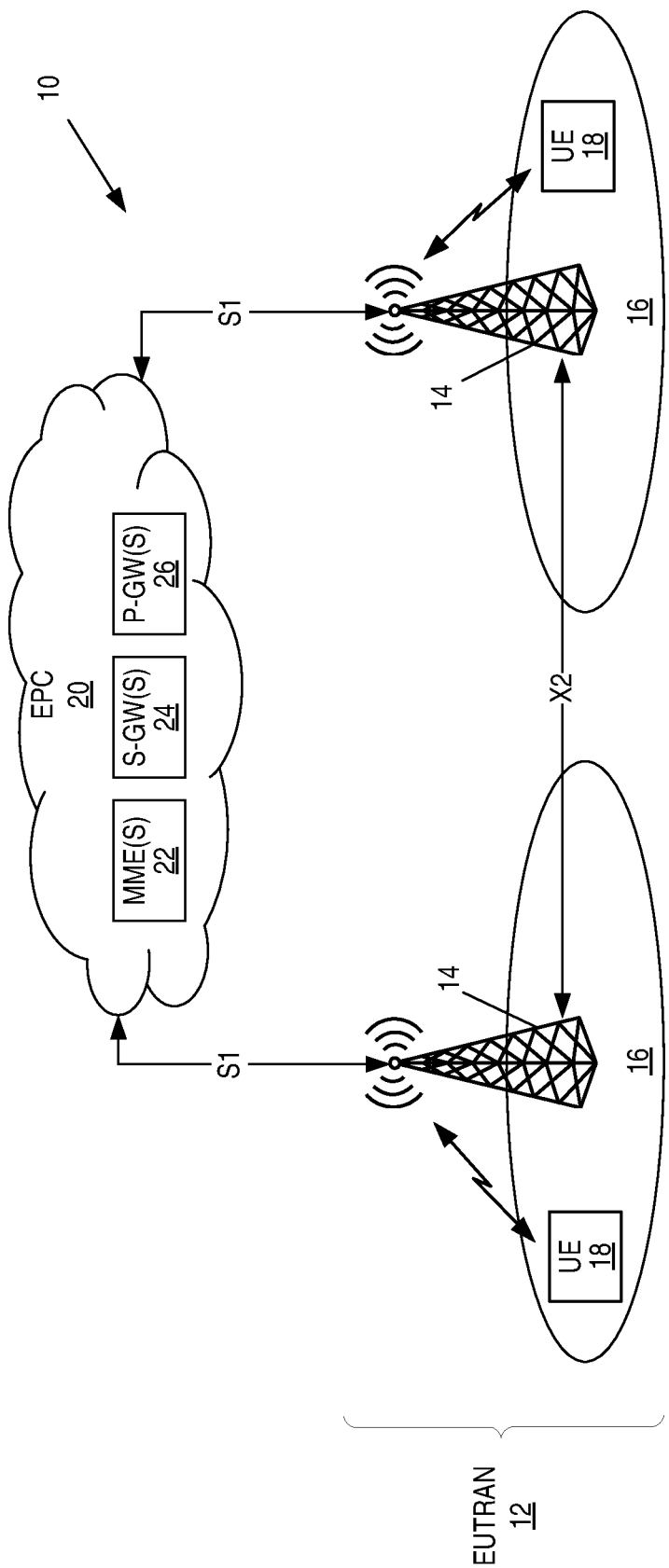
FIG. 11 illustrates one example of a cellular communications network.

FIG. 11 illustrates one example of a cellular communications network 10 in which embodiments of the present disclosure can be implemented. As illustrated, the cellular communications network 10 includes a Radio Access Network (RAN) 12 (e.g., an Evolved Universal Mobile Telecommunications System (UMTS) Radio Access Network (E-UTRAN) for Long Term Evolution (LTE)) including base stations 14 providing cells 16 of the cellular communications network 10. The base stations 14 provide radio access to UEs 18 located within the respective cells 16. The base stations 14 may be communicatively coupled via a base station to base station interface (e.g., an X2 interface in LTE). Further, the base stations 14 are connected to a core network 20 (e.g., an Evolved Packet Core (EPC) in LTE) via corresponding interfaces (e.g., S1 interfaces in LTE). The core network 20 includes various core network nodes such as, e.g., MMEs 22, Serving Gateways (S-GWs) 24, and Packet Data Network (PDN) Gateways (P-GWs) 26, as will be appreciated by one of ordinary skill in the art.

Figure 12:
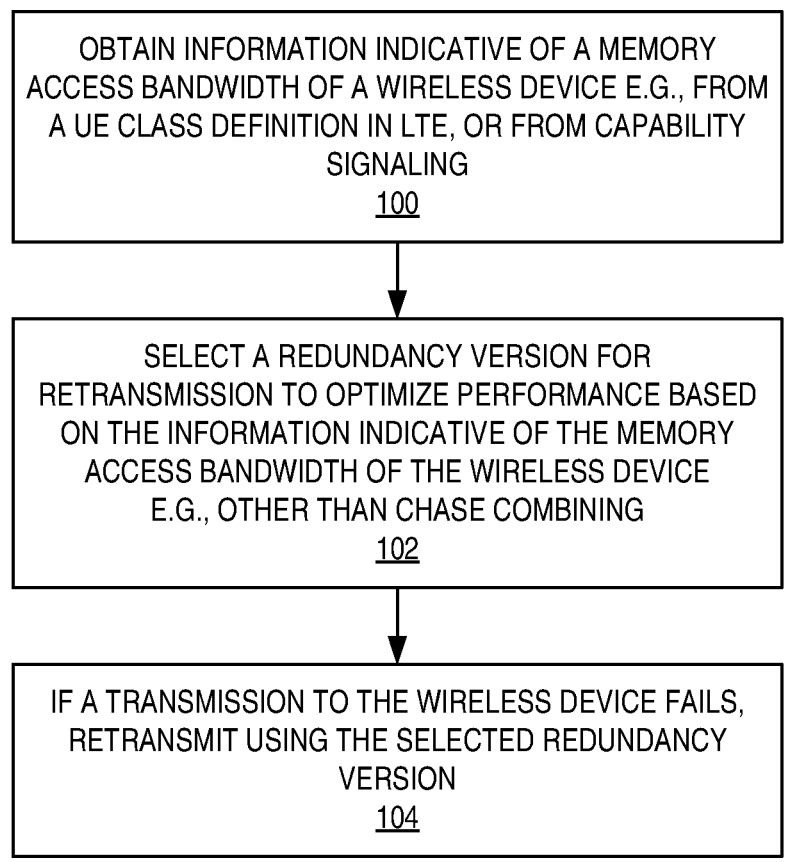
FIG. 12 is a flow chart illustrating the operation of a network node for retransmitting according to some embodiments of the present disclosure.

FIG. 12 illustrates a flow chart demonstrating a first embodiment where a transmitter obtains information indicative of a memory access bandwidth of a wireless device (step 100). Depending on the implementation, the wireless device is only able to perform a certain number of soft bit reads from the soft buffer and soft bit writes to the soft buffer. As used herein, the total number of reads and writes that the receiver is capable of performing in the allotted time is referred to as the memory access bandwidth. For instance, the design of the wireless device may be that the wireless device can read 36 columns from the soft buffer and then write 36 columns to the soft buffer. In this case, the memory access bandwidth of the wireless device would be proportional to read-writes of 72 columns. In some instances, the full implementation of a combining method may require more read-writes than this wireless device is capable of performing.

The transmitter then selects a redundancy version for retransmission to optimize performance based on the information indicative of the memory access bandwidth of the wireless device (step 102). If a transmission to the wireless device fails, the transmitter retransmits using the selected redundancy version (step 104). While some of the discussions and embodiments discuss a network node or base station as the transmitter and a UE or wireless device as the receiver, the present disclosure is not limited thereto.

The transmitter selects a redundancy version for retransmission to optimize performance even when the transmitter is aware of limited memory access bandwidth at the receiver. Such memory access bandwidth knowledge at the transmitter side may be obtained from the receiver class definition (such as the UE class definition in LTE specs) or from capability signaling from the receiver to the transmitter.

Figure 13:
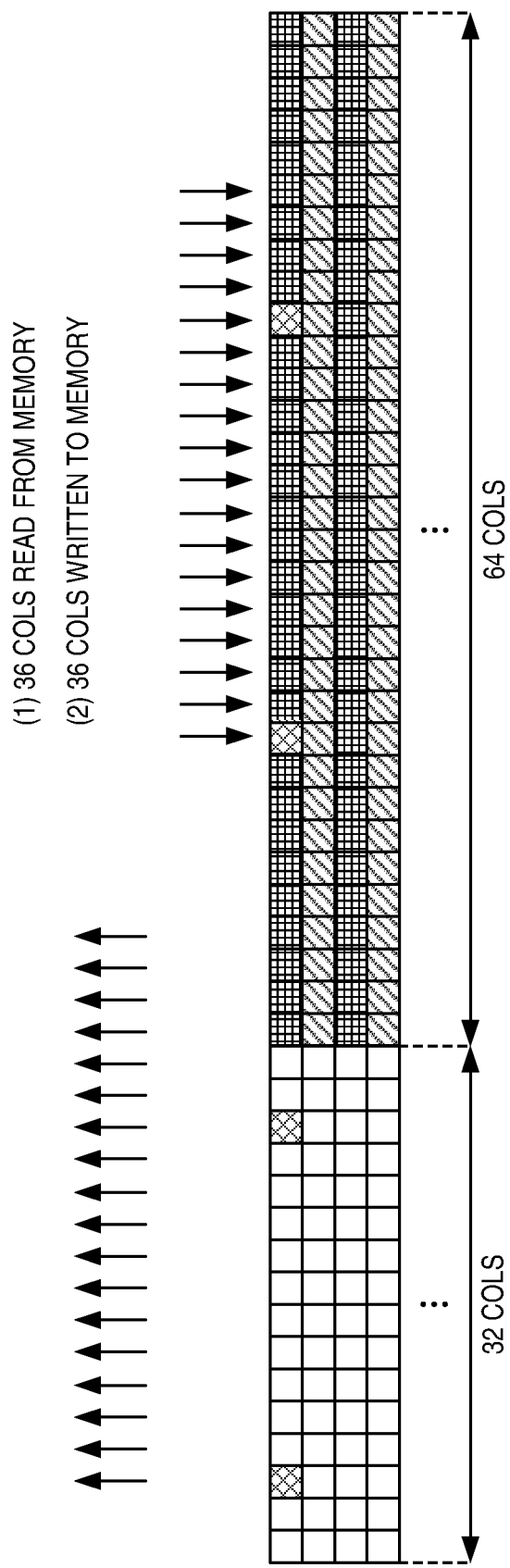
FIG. 13 illustrates an exemplary soft combining of soft bits for single-spatial layer transmission corresponding to using RV=0 and RV=2 for initial transmission and retransmission at high code rates according to some embodiments of the present disclosure.

This teaching is illustrated in FIG. 13 for the single-spatial transmission case. Given the receiver memory access bandwidth limitation, the transmitter selects RV=2 for retransmission instead of the the same redundancy value as in Chase Combining. It can be observed that the receiver can actually perform correct soft combining even under the memory access bandwidth limitation. More specifically, 36 cols (#2-#37) read from memory to combine with new soft bits After decoding fails, 36 cols (#50-#85) of new soft bits are written back to memory. It is noted here there is no need to write col #2-#37 back because these soft bits are not modified.

That is, the total memory access bandwidth is proportional to read-writes of 72 columns per turbo code block for the highest MCS transmission (i.e. 256 QAM MCS 27). This is the same as the minimum bandwidth requirement needed to support the Chase Combining protocol only proposal.

Figure 14:
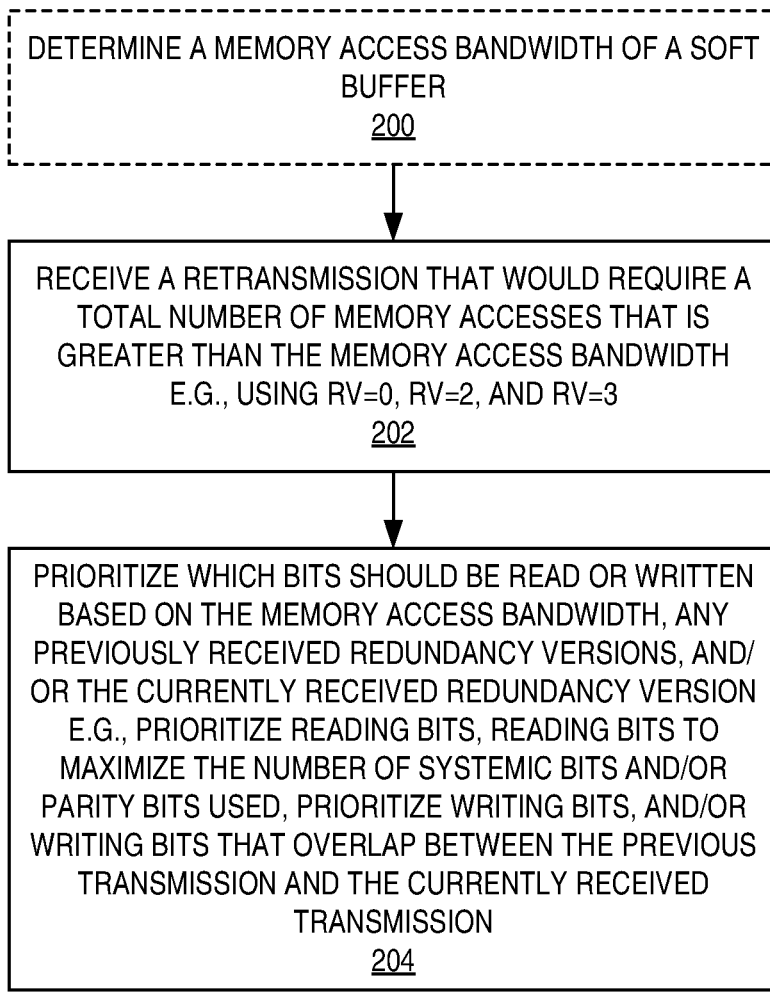
FIG. 14 is a flow chart illustrating the operation of a wireless device for receiving a retransmission according to some embodiments of the present disclosure.

FIG. 14 is a flow chart that illustrates the operation of a wireless device or other receiver. Optionally, the wireless device may determine a memory access bandwidth of a soft buffer (step 200). Then, the receiver receives a retransmission that would require a total number of memory accesses that is greater than the memory access bandwidth (step 202). The receiver prioritizes which bits should be read from or written to the soft buffer based on the memory access bandwidth, any previously received redundancy versions, and/or the currently received redundancy version (step 204). For example, in some embodiments, the receiver selects soft bits to read out of the soft buffer considering the memory access bandwidth limitation, the previously received redundancy versions, and the new redundancy version of the present retransmission. The selection of soft bits follows these priorities:

The selected soft bits and the newly received soft bits should contain as many systematic soft bits as possible. The receiver should select stored systematic soft bits to complement the systematic soft bits from the new retransmission.

After satisfying the first priority, the selection should maximize the number of parity soft bits in the selected soft bits and the newly received soft bits. The receiver should select parity soft bits that are different than the parity soft bits from the new retransmission Consider the memory access problem for the single-spatial layer transmission case illustrated in FIG. 8 as a first non-limiting example. According to the teaching, the receiver can instead select a number of soft bits that it can read out of the soft buffer given its bandwidth limitation. In this example, the receiver can only read 36 columns of soft bits. One exemplary embodiment for this receiver is illustrated in FIG. 15. It can be observed that:

The receiver first reads 18 columns of soft bits (columns #14-#31) to complement the systematic soft bits from the new retransmission.

Figure 1:
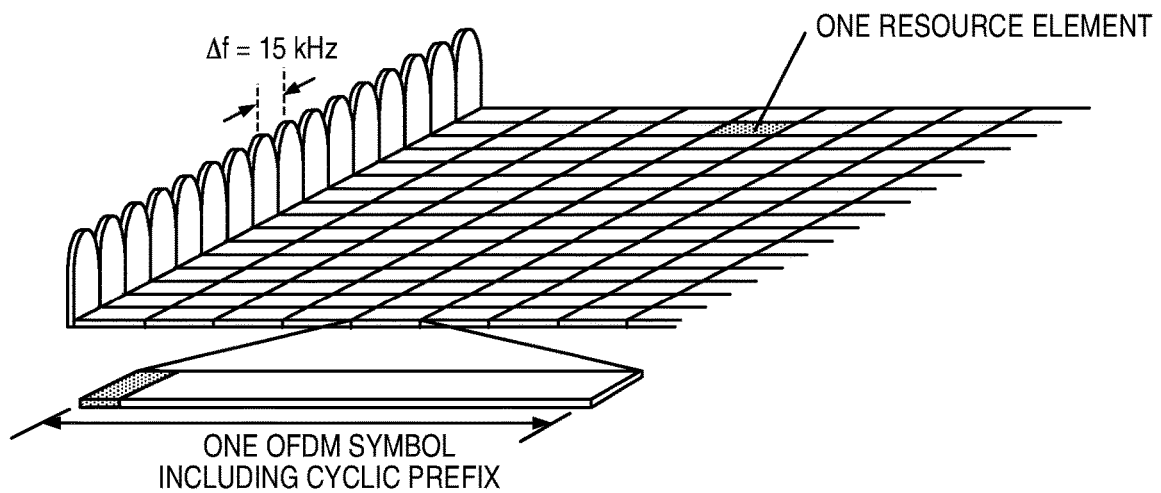
FIG. 1 illustrates a Long Term Evolution (LTE) downlink physical resource.
Figure 2:
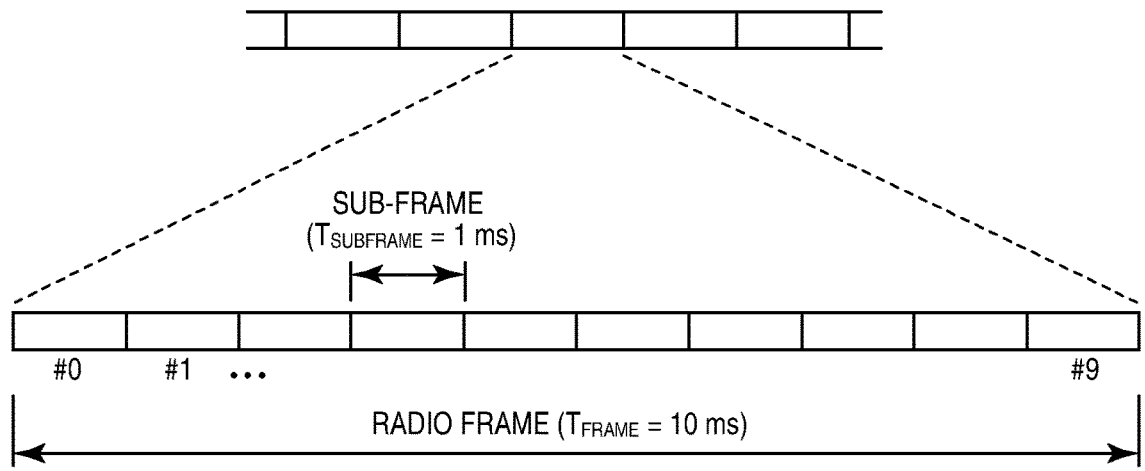
FIG. 2 illustrates an LTE time-domain structure.
Figure 3:
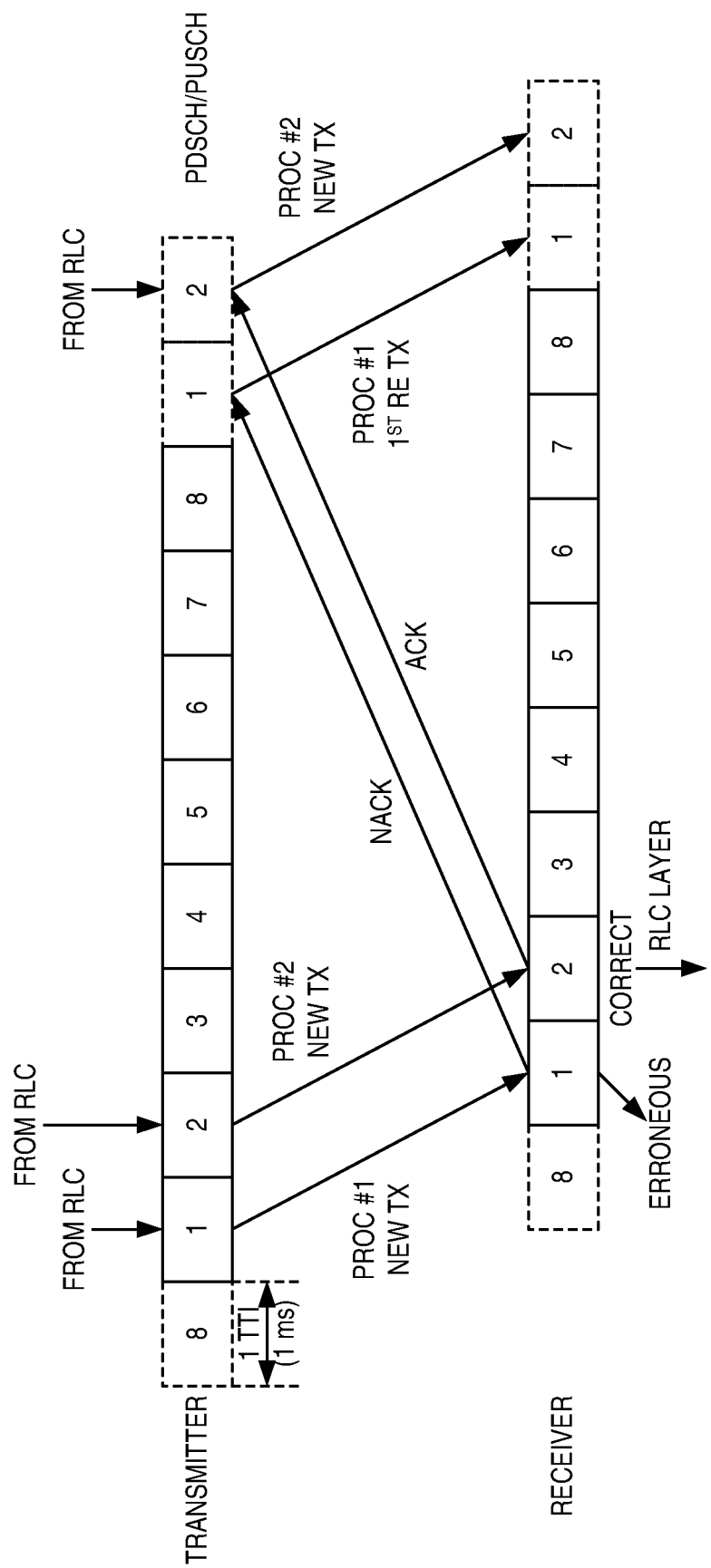
FIG. 3 illustrates Hybrid Automatic Repeat Request (HARQ) operation in LTE.
Figure 4:
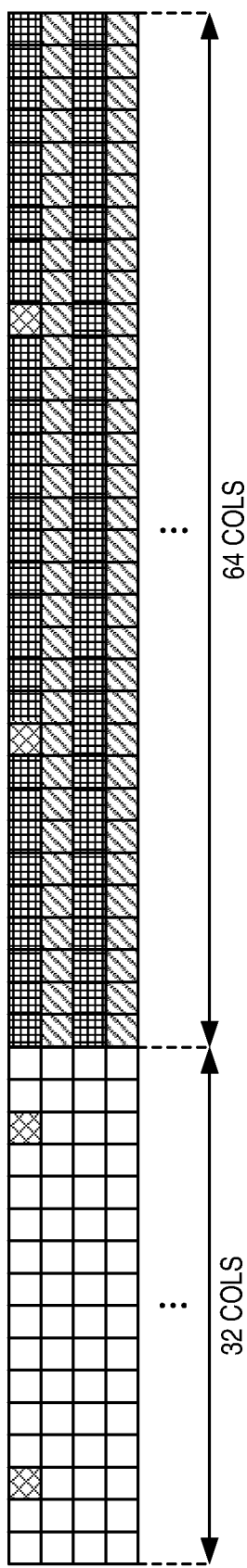
FIG. 4 illustrates an LTE circular buffer model for a single-spatial layer transmission.
Figure 5:
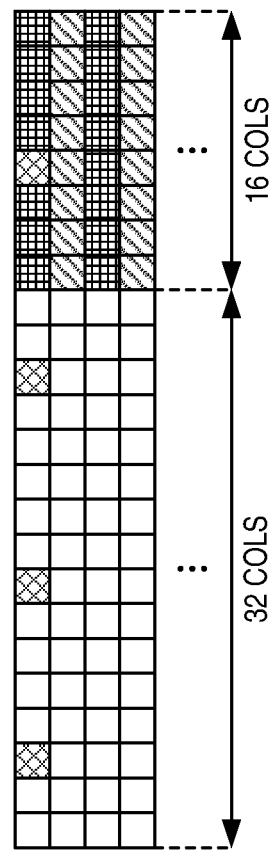
FIG. 5 illustrates an LTE circular buffer model for a multi-spatial layer transmission.
Figure 6:
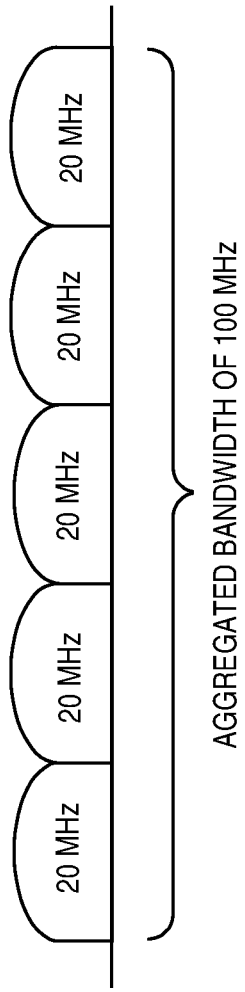
FIG. 6 illustrates carrier aggregation in LTE.
Figure 7:
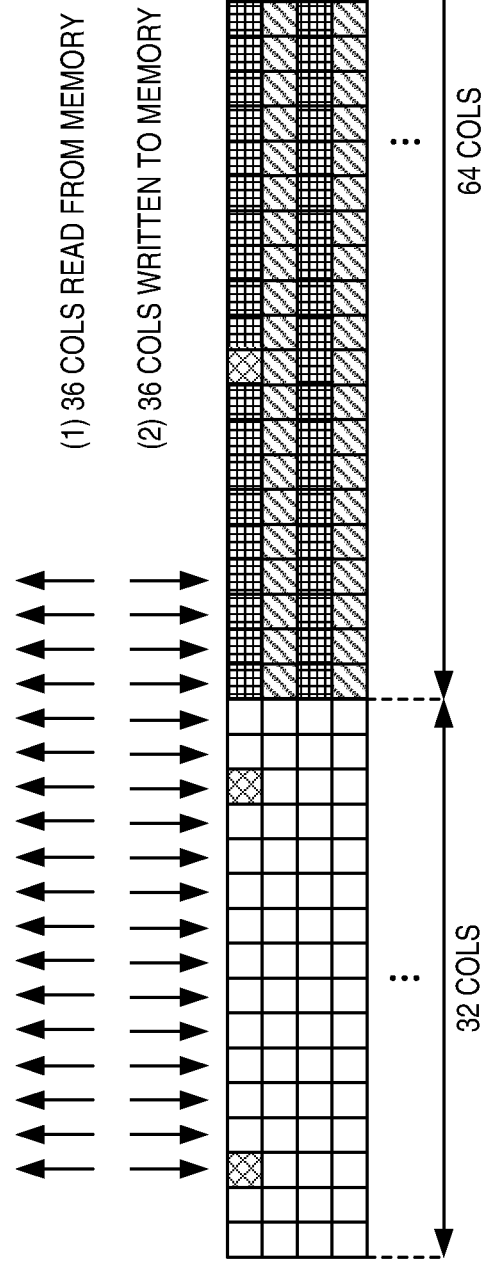
FIG. 7 illustrates an exemplary soft combining of soft bits for single-spatial layer transmission corresponding to using RV=0 for initial transmission and retransmissions at high code rates.
Figure 8:
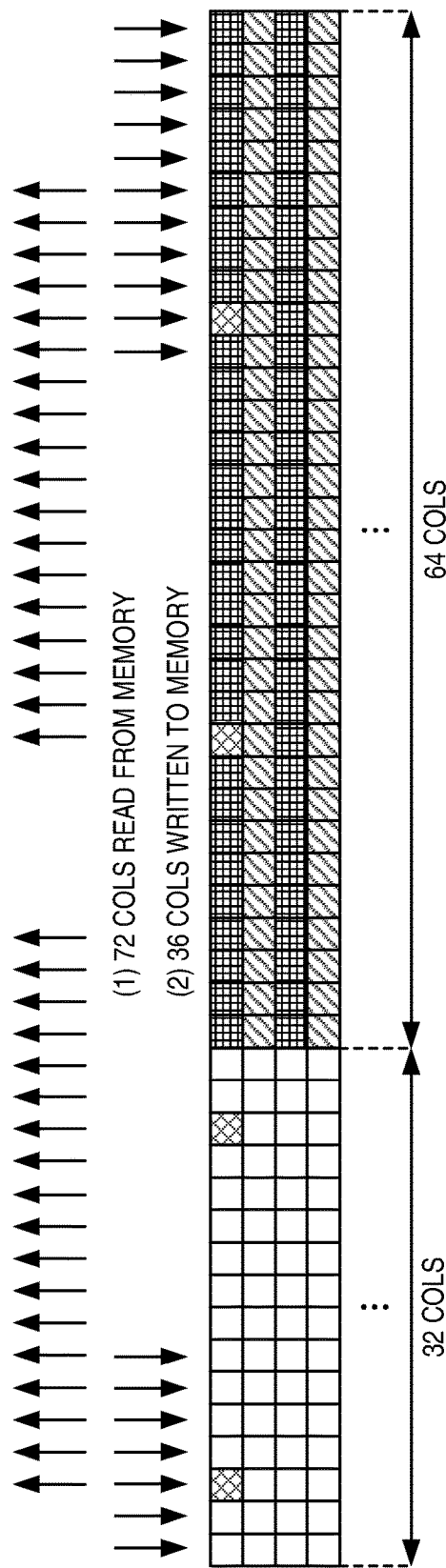
FIG. 8 illustrates an exemplary soft combining of soft bits for single-spatial layer transmission corresponding to using RV=0, RV=2, and RV=3 for initial transmission and retransmissions at high code rates.

The receiver can further read 14 columns of soft bits. According to the teaching, the receiver should select parity soft bits that are different than the parity soft bits from the new retransmission. In the illustrated non-limiting example in FIG. 15, the receiver continues the soft buffer reading on columns #32 to #37. It then reads the soft bits from columns #50 to #61. (The receiver skips columns #38 to #49 because no soft bits are stored for these columns as shown in FIG. 8.)

The exemplary embodiment allows effective combining of stored soft bits and newly received soft bits to achieve high error correction protection while not exceeding the soft buffer memory access bandwidth limitation.

The example illustrated in FIG. 15 represents an exemplary embodiment with unrestricted memory reading that allows retrieval of soft bits in non-continuous blocks and any starting read addresses. If certain implementations have restrictions to perform such optimized reading, some embodiments can be limited to contiguous block reading only and can be further restricted to start only at one of the redundancy version starting points. A non-limiting example of such a restricted receiver is illustrated in FIG. 16. It can be observed that the receiver reads 36 columns (#2-#37) of soft bits from the soft buffer to combine with the newly received soft bits.

Figure 9:
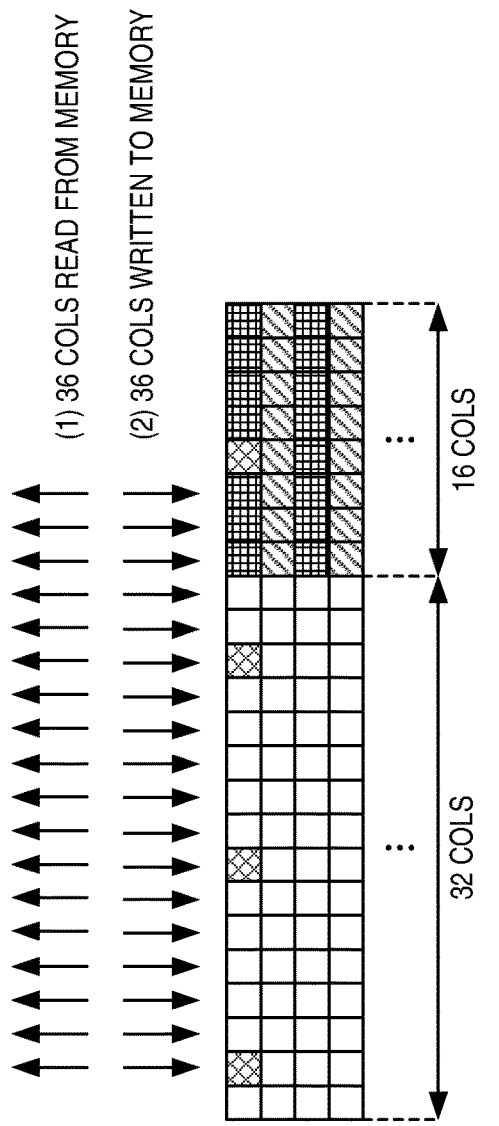
FIG. 9 illustrates an exemplary soft combining of soft bits for multi-spatial layer transmission corresponding to using RV=0 for initial transmission and retransmissions at high code rates.
Figure 10:
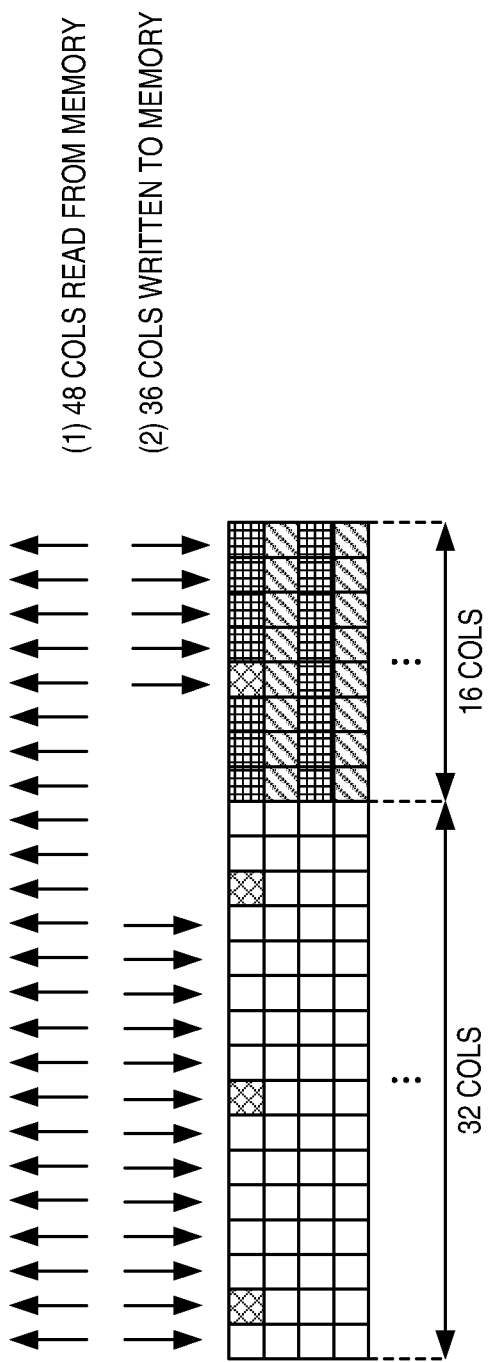
FIG. 10 illustrates an exemplary soft combining of soft bits for multi-spatial layer transmission corresponding to using RV=0, RV=2, and RV=3 for initial transmission and retransmissions at high code rates.

Consider the memory access problem for the multi-spatial layer transmission case illustrated in FIG. 9 as another non-limiting example. According to the teaching, the receiver should read soft bits from columns #2-#37 since the newly received soft bits correspond to columns #38-#47 and #0-#25. This is illustrated in FIG. 17.

In a second embodiment, if the decoding fails, the receiver selects soft bits to write to the soft buffer considering the memory access bandwidth limitation, the previously received redundancy versions, and the new redundancy version of the present retransmission. More specifically, the receiver selects the soft bits that are overlapping with the newly received soft bits in the retransmission.

The embodiment is illustrated in FIG. 13 for the single-spatial transmission case where the receiver writes back the soft bits for columns #50-#85 if the decoding fails after transmissions using RV=0 and RV=2. It is further illustrated in FIG. 15 for the single-spatial transmission case where the receiver writes back the soft bits for columns #74-#95 and #0-#13 if the decoding fails after transmissions using RV=0, RV=2 and RV=3.

The embodiment is further illustrated in FIG. 18 for the multi-spatial transmission case where the receiver writes back the soft bits for columns #26-#47 and #0-#13 if the decoding fails after transmissions using RV=0 and RV=2. It is further illustrated in FIG. 17 for the multi-spatial transmission case where the receiver writes back the soft bits for columns #38-#47 and #0-#25 if the decoding fails after transmissions using RV=0, RV=2 and RV=3.

The proposed solution is to achieve high system performance while keeping the receiver implementation limitation low as the alternative solutions. The proposed solution consists of:

The transmitter selects a redundancy version for retransmission to optimize performance. The redundancy version selection may further consider receiver memory access bandwidth.

The receiver selects soft bits to read out of the soft buffer considering the memory access bandwidth limitation, the previously received redundancy versions, and the new redundancy version of the present retransmission.

The receiver selects soft bits to write to the soft buffer considering the memory access bandwidth limitation, the previously received redundancy versions, and the new redundancy version of the present retransmission.

Figure 19:
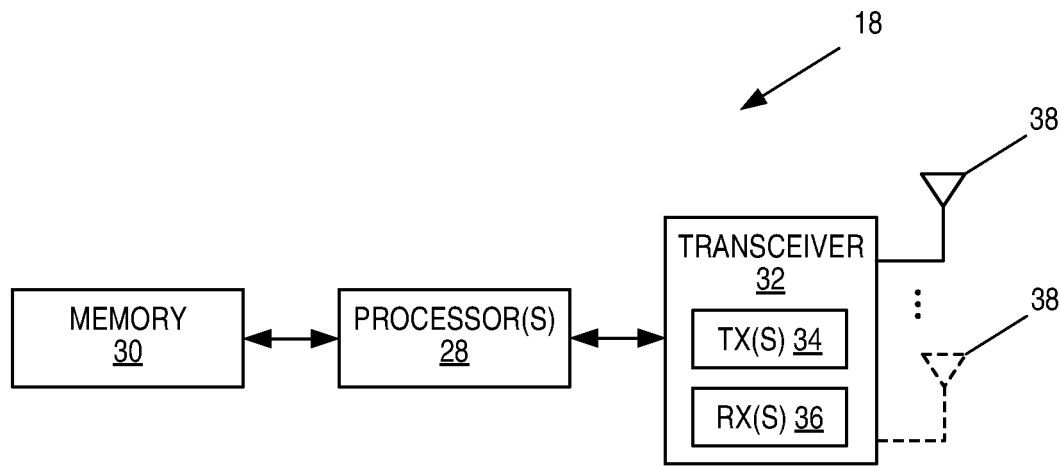
FIG. 19 is a block diagram of a User Equipment device (UE) according to some embodiments of the present disclosure.

FIG. 19 is a block diagram of the UE 18 according to some embodiments of the present disclosure. As illustrated, the UE 18 includes one or more processors 28 (e.g., one or more Central Processing Units (CPUs), one or more Application Specific Integrated Circuits (ASICs), one or more Field Programmable Gate Arrays (FPGAs), or the like, or any combination thereof), memory 30, and one or more transceivers 32 including one or more transmitters 34 and one or more receivers 36 coupled to one or more antennas 38. In some embodiments, the functionality of the UE 18 described herein is implemented in software, which is stored in the memory 30 and executed by the processor(s) 28.

In some embodiments, a computer program including instructions which, when executed by at least one processor, causes the at least one processor to carry out the functionality of the UE 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 30).

Figure 20:
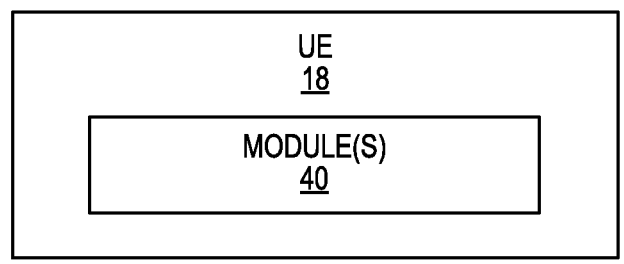
FIG. 20 is a block diagram of a UE according to some other embodiments of the present disclosure.

FIG. 20 is a block diagram of the UE 18 according to some other embodiments of the present disclosure. As illustrated, the UE 18 includes one or more modules 40, each of which is implemented in software. The module(s) 40 operate to provide the functionality of the UE 18 according to any of the embodiments described above with respect to FIGS. 12-18.

Figure 21:
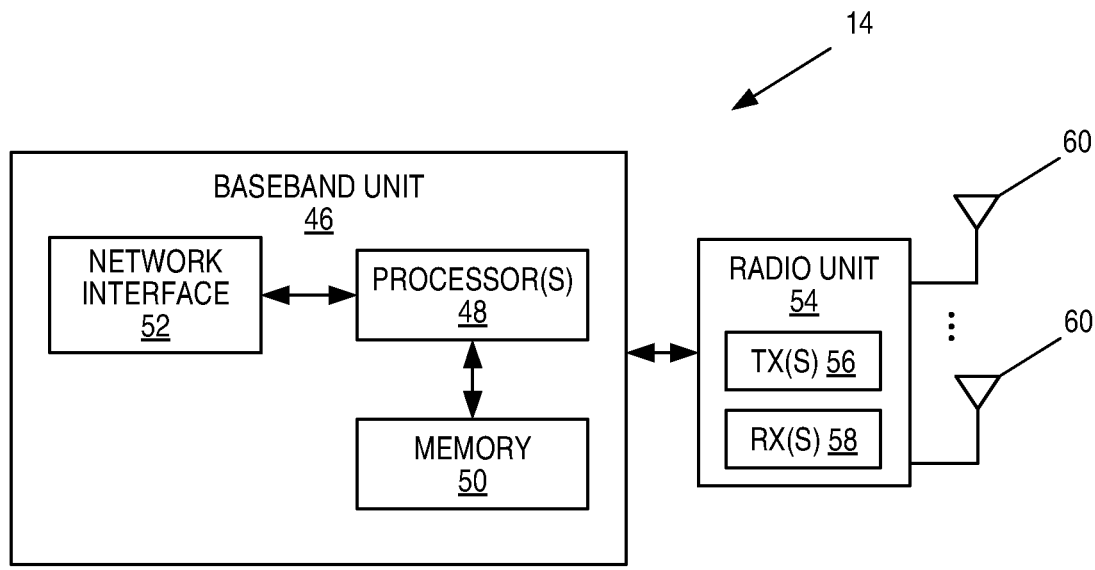
FIG. 21 is a block diagram of a network node according to some embodiments of the present disclosure.

FIG. 21 is a block diagram of the base station 14 according to some embodiments of the present disclosure. As illustrated, the base station 14 includes a baseband unit 46 that includes one or more processors 48 (e.g., one or more CPUs, one or more ASICs, one or more FPGAs, and/or the like, or any combination thereof), memory 50, and a network interface 52 (e.g., a network interface providing a connection to the core network 20 and/or other base stations 14). The base station 14 also includes one or more radio units 54 including one or more transmitters 56 and one or more receivers 58 connected to one or more antennas 60. In some embodiments, the functionality of the network node described herein is implemented in software, which is stored in the memory 50 and executed by the processor(s) 48.

Note that other network nodes may include components similar to those of the baseband unit 46 illustrated in FIG. 21.

In some embodiments, a computer program including instructions which, when executed by at least one processor, cause the at least one processor to carry out the functionality of the network node (e.g., the base station 14) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 22:
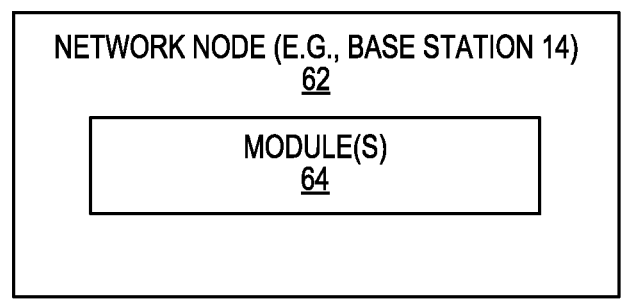
FIG. 22 is a block diagram of a network node according to some embodiments of the present disclosure.

FIG. 22 is a block diagram of a network node 62 (e.g., the base station 14) according to some other embodiments of the present disclosure. As illustrated, the network node 62 includes one or more modules 64, each of which is implemented in software. The module(s) 64 operate to provide the functionality of the network node 62 according to any of the embodiments described above with respect to FIGS. 12-18.

The following acronyms are used throughout this disclosure.

3GPP $3^{rd}$ Generation Partnership Project
ASIC Application Specific Integrated Circuit
ACK Acknowledgement
CA Carrier Aggregation
CC Component Carrier
CPE Customer Premises Equipment
CPU Central Processing Unit
CRC Cyclic Redundancy Check
D2D Device-to-Device
dB Decibel
DFT Discrete Fourier Transform
DL Downlink
eNB Evolved Node-B
EPC Evolved Packet Core
E-UTRAN Evolved UMTS Radio Access Network
FDD Frequency Division Duplexing
FPGA Field Programmable Gate Array
GHz Gigahertz
HARQ Hybrid Automatic Repeat Request
IEEE Institute of Electrical and Electronics Engineers
LAA-LTE License-Assisted Access via LTE
LEE Laptop Embedded Equipment
LME Laptop Mounted Equipment
LTE Long-Term Evolution
LTE-U LTE in Unlicensed Spectrum
M2M Machine-to-Machine
MBMS Multimedia Broadcast/Multicast Service
MCE Multi-cell/Multicast Coordination Entity
MCS Modulation and Coding Scheme
MDT Minimization of Drive Tests
MHz Megahertz
MIMO Multiple Input Multiple Output
MME Mobility Management Entity
OFDM Orthogonal Frequency Division Multiplexing
NACK Negative Acknowledgement
PCC Primary Component Carrier
PCell Primary Cell
PDN Packet Data Network
P-GW PDN Gateway
PSC Primary Serving Cell
PUCCH Physical Uplink Control Channel
PUSCH Physical Uplink Shared Channel
QAM Quadrature Amplitude Modulation
RAN Radio Area Network
RRH Remote Radio Head
RRU Remote Radio Unit
RV Redundancy Version
Rx Receive side
SCC Secondary Component Carrier
SCell Secondary Cell
S-GW Serving Gateway
SSC Secondary Serving Cell
TCE Trace Collection Entity
TDD Time Division Duplexing
TS Technical Specification
Tx Transmit side
UCI Uplink Control Information
UE User Equipment
UL Uplink
UMTS Universal Mobile Telecommunications System
USB Universal Serial Bus
UTRAN Universal Terrestrial Radio Access Network
WLAN Wireless Local Area Network Those skilled in the art will recognize improvements and modifications to the embodiments of the present disclosure.

All such improvements and modifications are considered within the scope of the concepts disclosed herein and the claims that follow.

What is claimed is:

1. A method of operation of a User Equipment, UE, of a cellular communications network comprising:
   receiving a retransmission that would require a total number of memory accesses to process that is greater than a memory access bandwidth of a soft buffer of the UE where the memory access bandwidth relates to a total number of reads and/or writes that a receiver is capable of performing in an allotted time; and
   prioritizing which bits should be read from or written to the soft buffer of the UE when processing the retransmission based on the memory access bandwidth, any previously received redundancy versions, and/or a currently received redundancy version, wherein prioritizing comprises writing bits to the soft buffer of the UE to maximize a number of bits that overlaps between a previous transmission and the retransmission and therefore not all of the bits will be read from the soft buffer of the UE when processing the retransmission.

2. The method of claim 1 further comprising, prior to receiving the retransmission, determining the memory access bandwidth of the soft buffer of the UE.

3. The method of claim 1 wherein prioritizing which bits should be read or written comprises prioritizing reading bits from the soft buffer of the UE, and therefore not all bits will be written to the soft buffer of the UE when processing the retransmission.

4. The method of claim 3 wherein prioritizing reading bits from the soft buffer of the UE comprises reading bits from the soft buffer of the UE to maximize a number of systemic bits read when processing the retransmission.

5. The method of claim 3 wherein prioritizing reading bits from the soft buffer of the UE comprises reading bits from the soft buffer of the UE to maximize a number of parity bits read when processing the retransmission.

6. The method of claim 3 wherein prioritizing reading bits from the soft buffer of the UE comprises reading bits from the soft buffer of the UE to maximize a number of bits that overlaps between previous transmissions.

7. The method of claim 6 wherein receiving the retransmission comprises receiving a redundancy version retransmission for incremental redundancy.

8. The method of claim 7 wherein the UE is a Machine Type Communication, MTC, UE.

9. A non-transitory computer readable medium comprising instructions which, when executed on at least one processor, cause the at least one processor to carry out the method according to claim 1.

10. A User Equipment, UE, comprising:
    circuitry comprising one or more processors and a memory containing instructions whereby the UE is configured to:
      receive a retransmission that would require a total number of memory accesses to process that is greater than a memory access bandwidth of a soft buffer of the UE where the memory access bandwidth relates to a total number of reads and/or writes that a receiver is capable of performing in an allotted time; and
    prioritize which bits should be read from or written to the soft buffer of the UE when processing the retransmission based on the memory access bandwidth, any previously received redundancy versions, and/or a currently received redundancy version, wherein prioritize comprises write bits to the soft buffer of the UE to maximize a number of bits that overlaps between a previous transmission and the retransmission and therefore not all of the bits will be read from the soft buffer of the UE when processing the retransmission.

* * * * *